(12) United States Patent
Murata

(10) Patent No.: US 10,937,608 B2
(45) Date of Patent: Mar. 2, 2021

(54) OPERATION PANEL AND IMAGE FORMING APPARATUS

(71) Applicant: KYOCERA Document Solutions Inc., Osaka (JP)

(72) Inventor: Koji Murata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/594,113

(22) Filed: Oct. 7, 2019

(65) Prior Publication Data

US 2020/0126738 A1 Apr. 23, 2020

(30) Foreign Application Priority Data

Oct. 17, 2018 (JP) .............................. JP2018-195617

(51) Int. Cl.
*H01H 13/26* (2006.01)
*G06F 3/02* (2006.01)
*H04N 1/00* (2006.01)

(52) U.S. Cl.
CPC ............ *H01H 13/26* (2013.01); *G06F 3/0202* (2013.01); *H04N 1/00384* (2013.01); *H01H 2221/044* (2013.01); *H01H 2231/016* (2013.01)

(58) Field of Classification Search
CPC ........ H01H 13/14; H01H 3/125; H01H 13/70; H01H 3/12; H01H 2221/044; H01H 13/06; H01H 2223/002; H01H 9/04; H01H 13/86; H01H 2009/048; H01H 13/063; H01H 21/08; H01H 23/06; H01H 13/26; H01H 2231/016; H01H 13/20; G06F 3/0202; H04N 1/00384
See application file for complete search history.

(56) References Cited

U.S. PATENT DOCUMENTS 9,256,293 B2 * 2/2016 Miyagawa ................ G06F 3/02
2003/0174590 A1 * 9/2003 Arikawa .............. G04B 37/106
368/319

FOREIGN PATENT DOCUMENTS

| CN | 20141048094 | * | 8/2015 | ............. H01H 13/14 |
| JP | H06-208818 A | | 7/1994 | |
| JP | 2013-127895 A | | 6/2013 | |

* cited by examiner

*Primary Examiner* — Ahmed M Saeed
(74) *Attorney, Agent, or Firm* — Studebaker & Brackett PC

(57) ABSTRACT

An operation panel includes a push key and a switch. The push key is depressed through an opening formed in a panel body. The switch is pushed by depressing of the push key. The push key includes a tapered part tapered toward the switch. The panel body includes an elastic piece inclined toward the tapered part from a circumference of the opening and elastically deformable to an opposite side to the tapered part. When the push key is depressed, the elastic piece is elastically deformed to the opposite side by the tapered part. When the depressing of the push key is released, the push key is pushed up by an elastic restoring force of the elastic piece.

5 Claims, 7 Drawing Sheets

OPERATION PANEL AND IMAGE FORMING APPARATUS

INCORPORATION BY REFERENCE

This application is based on and claims the benefit of priority from Japanese patent application No. 2018-195617 filed on Oct. 17, 2018, which is incorporated by reference in its entirety.

BACKGROUND

The present disclosure relates to an operation panel including a switch pushed by a push key and an image forming apparatus including the operation panel.

An image forming apparatus is provided with an operation panel operated by a user in various cases containing a case where an image forming operation is started or stopped or another case where a sheet size is selected, for example. The operation panel includes a touch panel, a push switch and the others. The push switch has a push key depressed by the user and a switch (for example, a tact switch) pushed by the push key. In a case of the tact switch, after a push button is pushed, the push button is retuned by a reverse spring of a contact. On the other hand, a way to return the push key includes a way using a weight of the push key and another way using an elastic member. Among the ways, because the way using a weight of the push key has a problem that a return failure of the push key may occur, the way using an elastic member is conventionally employed.

For example, a multiple-connected key having a hinge elastically supporting a key (the push key) and a button key structure having a frame member supporting a button key (the push key) via an elastic arm member are known.

However, in cases of using the hinge and the elastic arm member, a structure to support the member is required. Additionally, because the member is complicated in structure and has a small and thin size, it is easily deformed or broken. Furthermore, a problem that a mold to produce the member becomes complicated in structure may occur.

SUMMARY

In accordance with an aspect of the present disclosure, an operation panel includes a push key and a switch. The push key is depressed through an opening formed in a panel body. The switch is pushed by depressing of the push key. The push key includes a tapered part tapered toward the switch. The panel body includes an elastic piece inclined toward the tapered part from a circumference of the opening and elastically deformable to an opposite side to the tapered part. When the push key is depressed, the elastic piece is elastically deformed to the opposite side by the tapered part. When the depressing of the push key is released, the push key is pushed up by an elastic restoring force of the elastic piece.

In accordance with an aspect of the present disclosure, an image forming apparatus comprises the operation panel.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, an operation panel and an image forming apparatus according to an embodiment of the present disclosure will be described with reference to the drawings.

Figure 1:
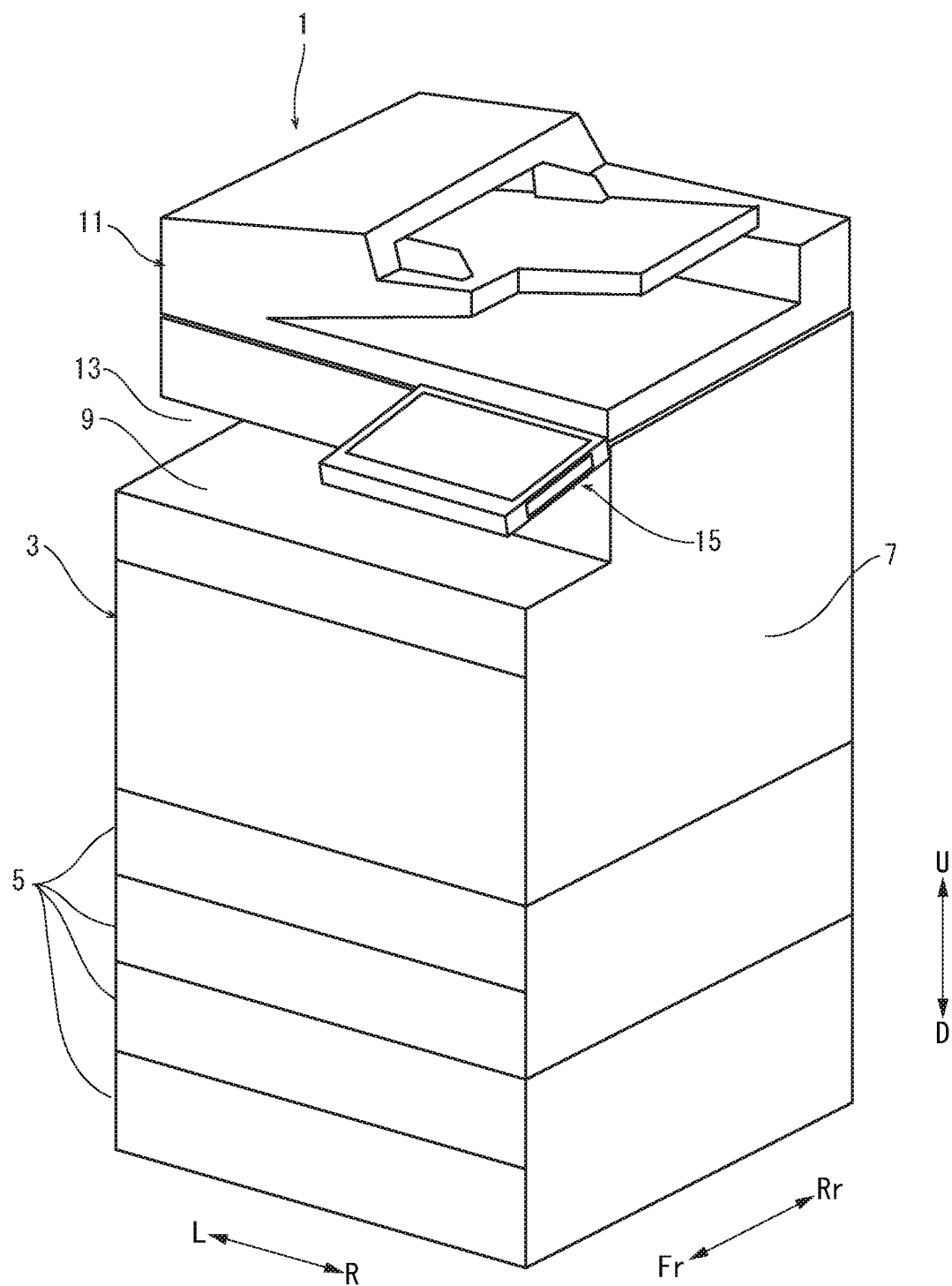
FIG. 1 is a perspective view showing an image forming apparatus according to one embodiment of the present disclosure.

With reference to FIG. 1, the image forming apparatus 1 will be described. FIG. 1 is a perspective view showing the image forming apparatus. In each figure, Fr, Rr, L, R, U and D respectively show a front side, a rear side, a left side, a right side, an upper side and a lower side of the image forming apparatus 1.

An apparatus main body 3 of the image forming apparatus 1 is provided with a sheet feeding cassette 5 in which a sheet is stored and an image forming part 7 which forms a toner image on the sheet. On an upper face of the apparatus main body 3, a discharge tray 9 on which the sheet formed with an image is stacked. The image forming apparatus 1 is provided with a document reading device 11 which reads an image of a document. The document reading device 11 is disposed above the apparatus main body 3 of the image forming apparatus 1. Between the document reading device 11 and the discharge tray 9, a sheet discharge space 13 is formed.

The document reading device 11 supports an operation panel 15. The operation panel 15 is supported on a right end portion of a front face of the document reading device 11 in an inclined posture in an oblique front lower direction.

Figure 2:
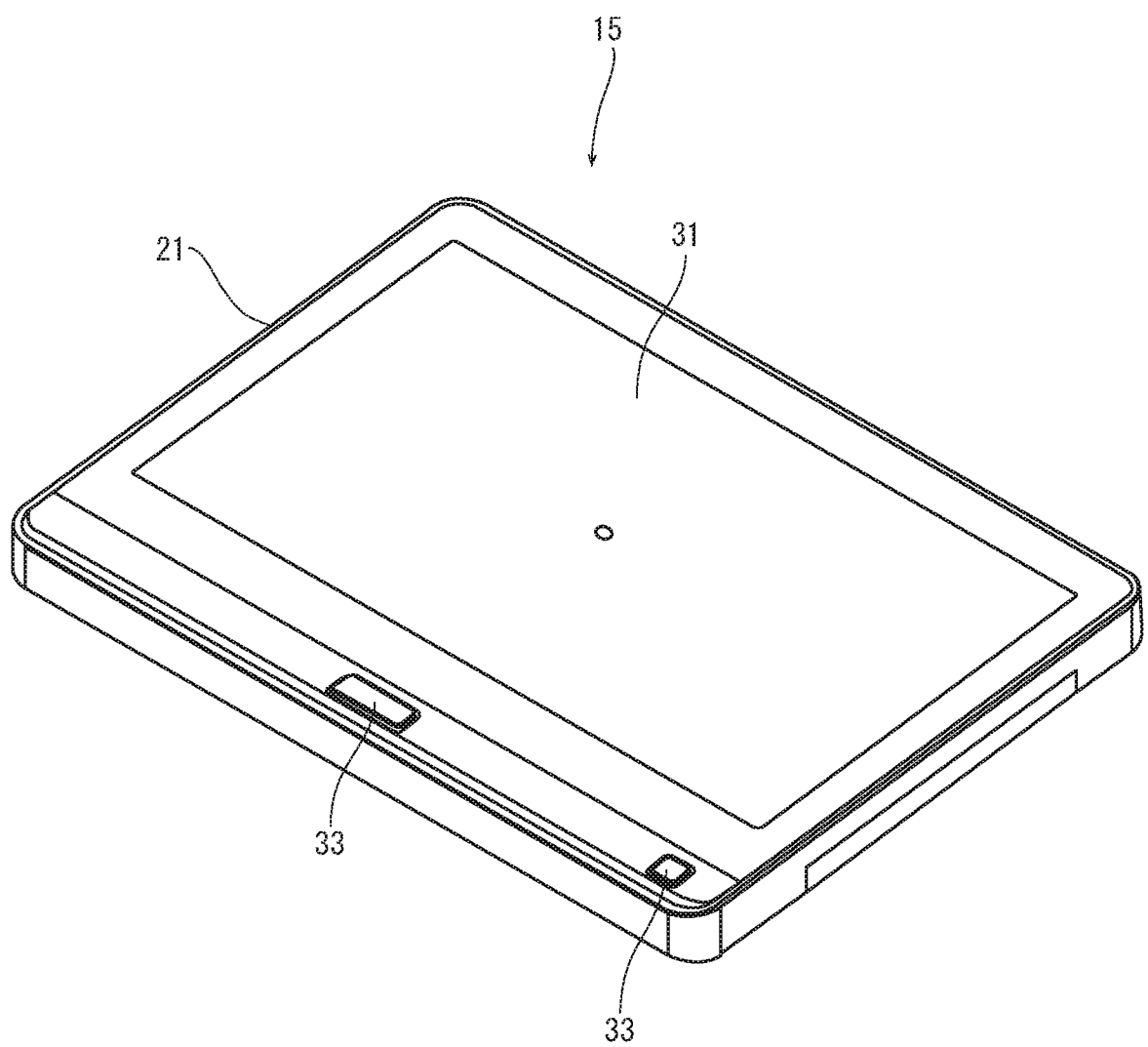
FIG. 2 is a perspective view showing an operation panel, when viewed from the front face side, according to the embodiment of the present disclosure.
Figure 3:
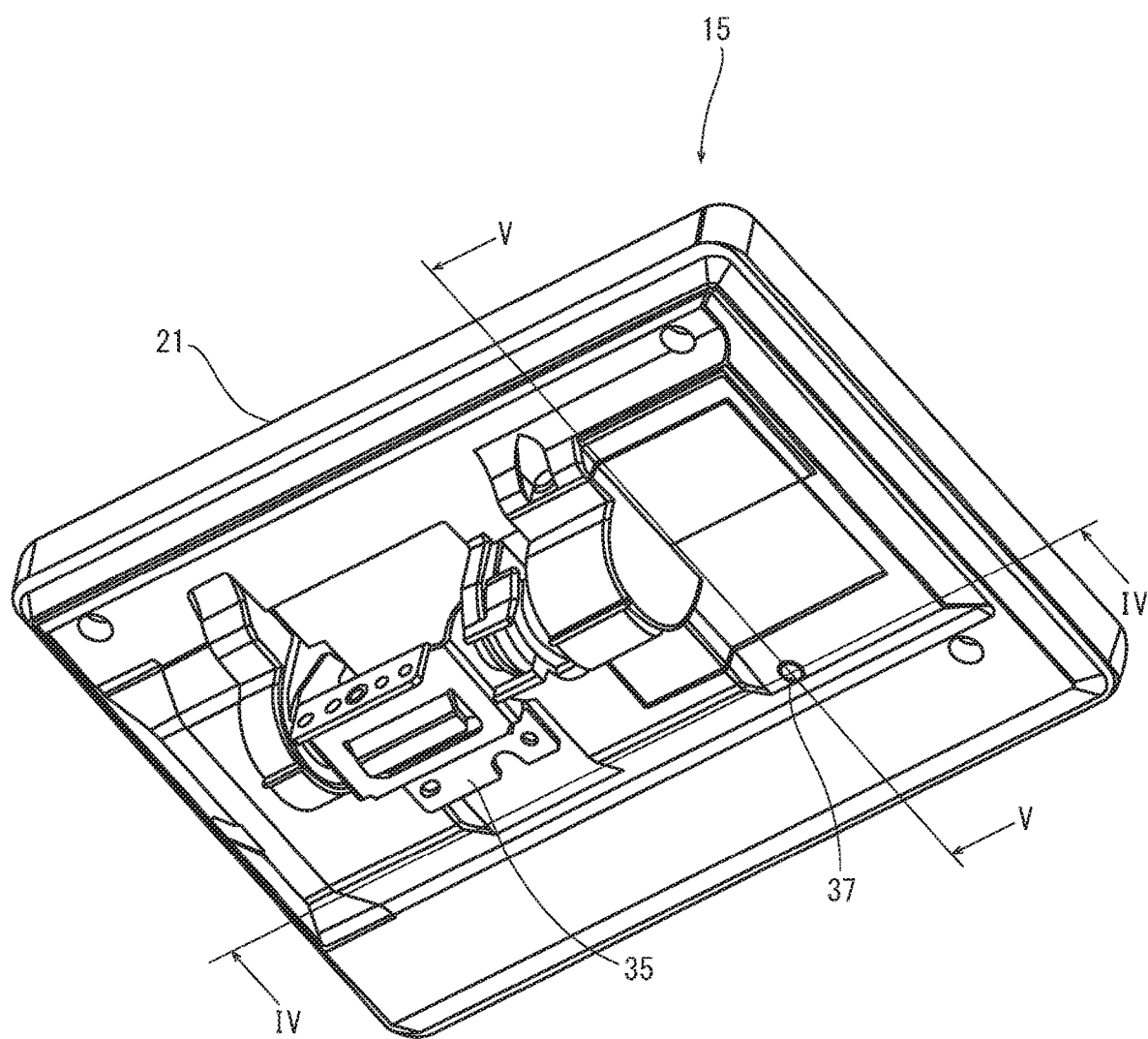
FIG. 3 is a perspective view showing the operation panel, when viewed from the back face side, according to the embodiment of the present disclosure.
Figure 4:
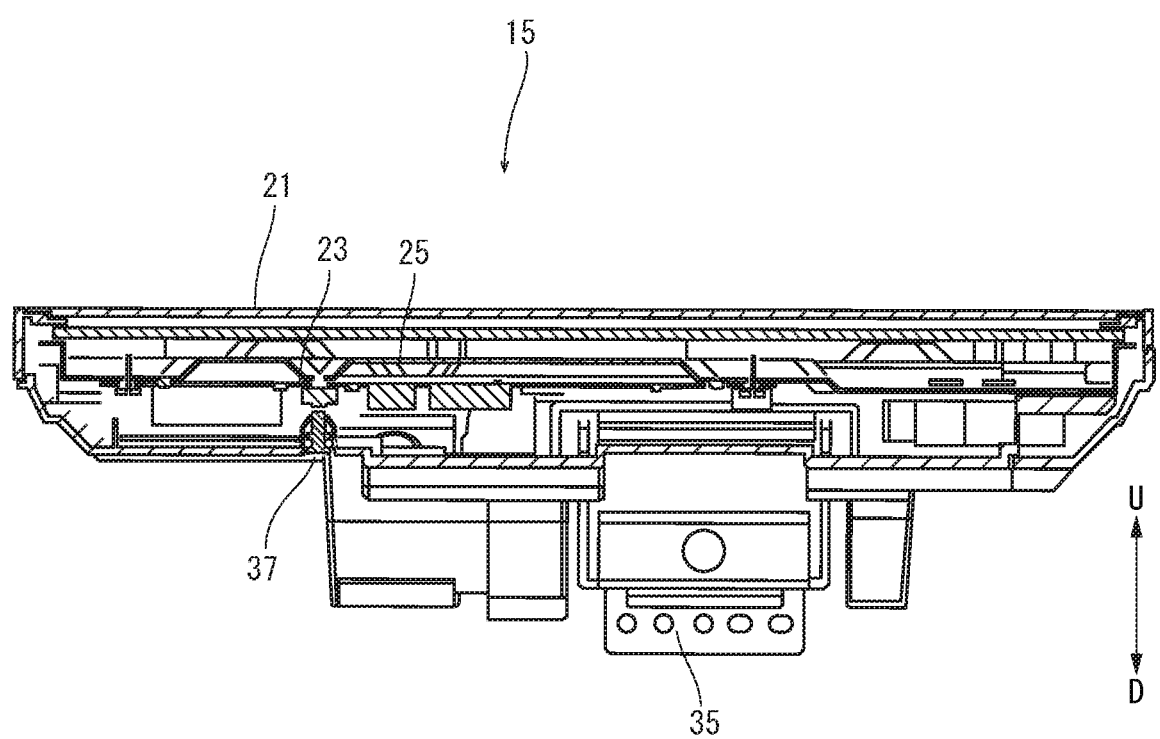
FIG. 4 is a cross sectional view along a IV-IV line in FIG. 3.
Figure 5:
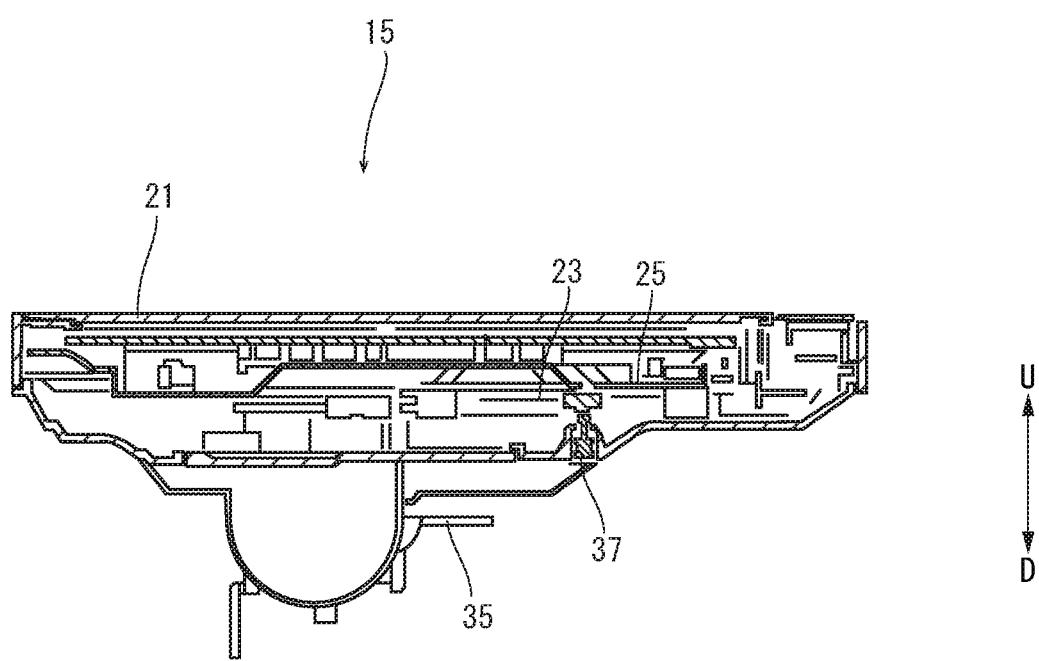
FIG. 5 is a cross sectional view along a V-V line in FIG. 3.

Next, with reference to FIG. 2 to FIG. 5, the operation panel 15 will be described. FIG. 2 is a perspective view showing the operation panel when viewed from the front face side, FIG. 3 is a perspective view showing the operation panel when viewed from the back face side, FIG. 4 is a cross sectional view along a IV-IV line of FG. Sand FIG. 5 is cross sectional view along a V-V line of FIG. 3.

As shown in FIG. 2 and FIG. 3, the operation panel 15 includes a shallow parallelepiped hollow panel body 21. In a hollow space of the panel body 21, a board 23, a metal plate 25 supporting the board 23 and the others are stored.

The panel body 21 is made of resin. As shown in FIG. 2, on a front face (an upper face) of the panel body 21, a touch panel 31 and a push button 33 which are operated by a user are provided. The user operates the touch panel 31 and the push button 33 to start or stop an image forming operation or to select various items (a sheet size, a number of printing sheets or the others) regarding the image forming operation.

On a back face (a lower face) of the panel body 21, as shown in FIG. 3, an attachment 35 supported by the document reading device 11 is formed. Additionally, on the back face of the panel body 21, a push switch 37 is provided.

Figure 6A:
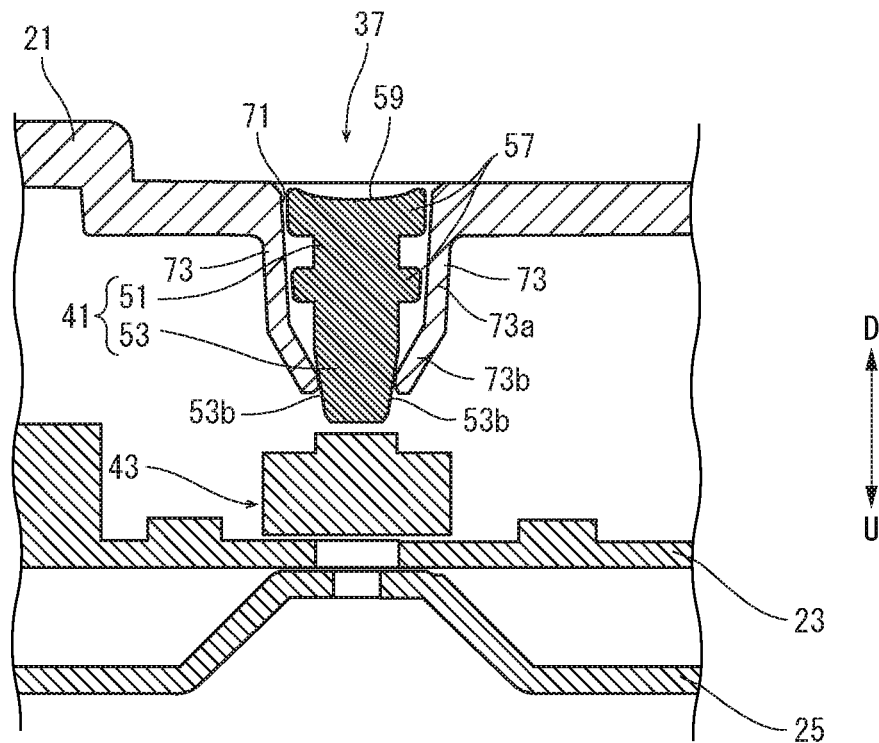
FIG. 6A is a cross sectional view (a cross sectional view along the IV-IV line in FIG. 3) of a push switch in a normal state, in the operation panel according to the embodiment of the present disclosure.
Figure 6B:
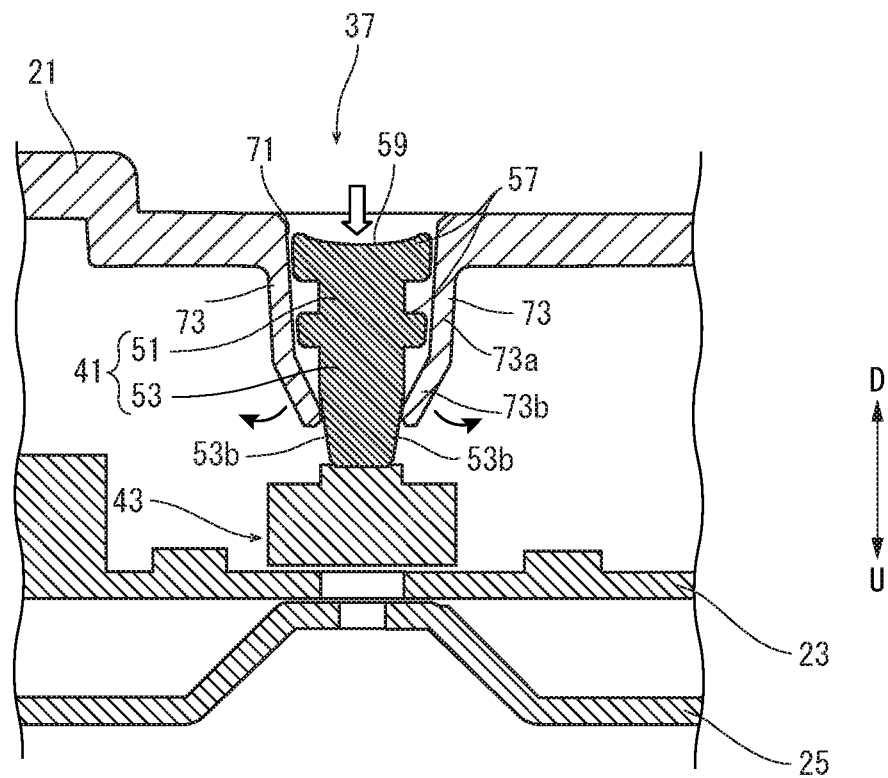
FIG. 6B is a cross sectional view (a cross sectional view along the IV-IV line in FIG. 3) of the push switch when a push button is depressed, in the operation panel according to the embodiment of the present disclosure.
Figure 7:
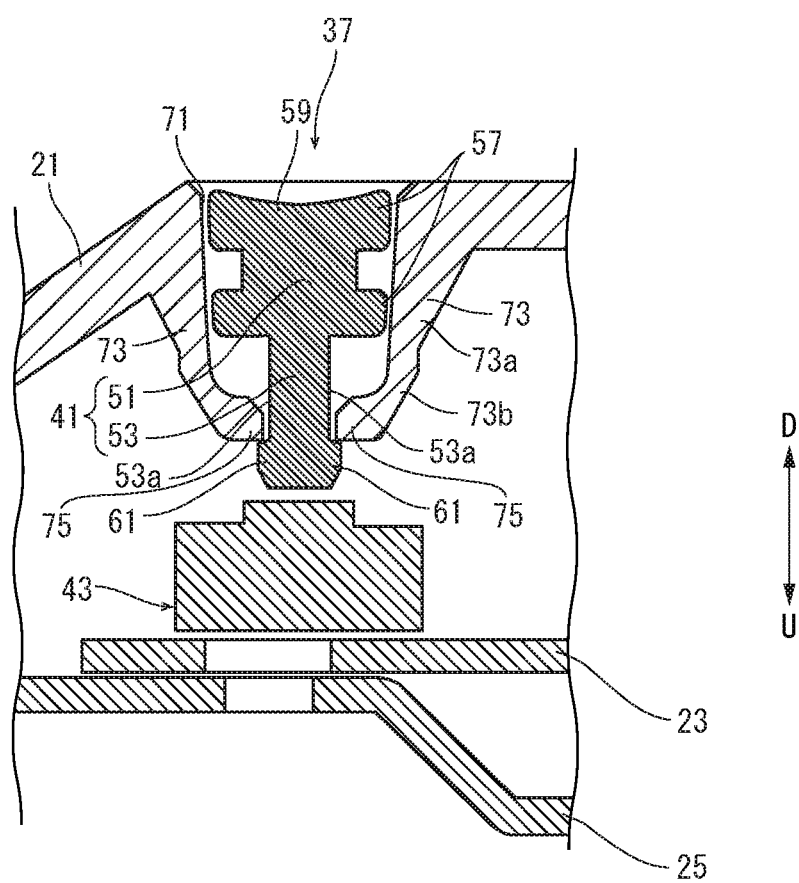
FIG. 7 is a cross sectional view (a cross sectional view along the V-V line in FIG. 3) of the push switch in the normal state, in the operation panel according to the embodiment of the present disclosure.

Next, with reference to FIG. 6A, FIG. 6B and FIG. 7, the push switch 37 will be described. FIG. 6A is the IV-IV line cross sectional view of the push switch in a normal state, FIG. 6B is the IV-IV line cross sectional view of the push switch when a push button is depressed and FIG. 7 is the V-V line cross sectional view of the push switch at the normal state. FIGS. 6A to 7 show the push switch 37 turned upside down.

The push switch 37 includes a push key 41 and a tact switch 43. When the push key 41 is depressed, the tact switch 43 is pushed down to be switched from an OFF state to an ON state. When the depressing of the push key 41 is released, the pushing down of the tact switch 43 is released to be switched from the ON state to the OFF state. Although the tact switch 43 is switchable to the ON state and to the OFF state by being pushed down directly, in a case where the tact switch 43 is stored in the hollow space of the panel body 21 and there is a certain degree of distance between a surface of the panel body 21 and the tact switch 43, using the push key 41 makes it becomes possible to obtain more longer stroke.

The push key 41 is formed in an approximately columnar shape, and has an operated part 51 on a side of being depressed by the user and a pushing part 53 on a side of the tact switch 43. The operated part 51 and the pushing part 53 are axially aligned. An axial length of the pushing part 53 is slightly shorter than an axial length of the operated part 51. The push key 41 is made of resin.

The operated part 51 has a columnar shape having a uniform outer diameter. At both axial end portions of the operated part 51, annular flanges 57 are protruded radially around the outer circumferential face. The flanges 57 have the same outer diameter. The flange 57 formed on a side of an end face of the operated part 51 is formed continuously to the end face. One face of the flange 57 continuously to the end face and the end face are formed in a shallow concave face forming a depressed face 59 which is depressed by the user.

The pushing part 53 is formed in an axially long approximately parallelepiped shape. The pushing part 53 has a pair of long side faces 53a (refer to FIG. 7) and a pair of short side faces 53b (refer to FIG. 6). The long side face 53a has a width equal to the diameter of the operated part 51, and the short side face 53b has a width shorter than the diameter of the operated part 51. As shown in FIG. 7, on the tip end portion of each long side face 53a, a slip-off prevention projection 61 is protruded outwardly. As shown in FIG. 6A, almost the tip side half portions of the short side faces 53b are tapered toward the tip end. That is, almost the tip side half portions of the long side faces 53a are formed such that those width are narrowed toward the tip end. In the following description, the pair of short side faces 53b is called a tapered part 53b.

The push key 41 is supported by the panel body 21. On the back face of the panel body 21, a circular opening 71 through which the push key 41 is stored is formed. Around the opening 71, four elastic pieces 73 are formed integrally with the panel body 21. The four elastic pieces 73 are disposed at equal intervals (a center angle of 90°) around a center of the opening 71. Each elastic piece 73 has a base portion 73a and a tip portion 73b. The base portion 73a is bent at approximately a right angle with respect to the back face of the panel body 21. The tip portion 73b is inclined toward the center of the opening 71 from the tip end of the base portion 73a. The tip portion 73b is inclined at an obtuse angle with respect to the base portion 73a. Each elastic piece 73 is deformable outwardly (to a side opposite to the center of the opening 71). Each elastic piece 73 has a length shorter than the axial length of the push key 41.

As shown in FIG. 7, on tip end portions of a first pair of the elastic pieces 73 facing in one direction (a direction along the V-V line cross section of the operation panel 15, refer to FIG. 3), projections 75 are protruded toward the center of the opening 71. As shown in FIG. 6A, a second pair of the elastic pieces 73 facing in the other direction (a direction along the IV-IV line cross section of the operation panel 15, refer to FIG. 3) has no projections 75.

The push key 41 is stored in a space surrounded by the opening 71 and the four elastic pieces 73. As shown in FIG. 6A, the tip end portions of the second pair of the elastic pieces 73 of the panel body 21 come into contact with both the tapered parts 53b of the pushing part 53 of the push key 41. As shown in FIG. 7, the projections 75 of the first pair of the elastic pieces 73 of the panel body 21 are overlapped with the slip-off prevention projections 61 of the long side faces 53a of the push key 41 in a depressing direction of the push key 41. In detail, the slip-off prevention projections 61 of the push key 41 are overlapped with the projections 75 of the elastic pieces 73 on a side of the tact switch 43 (a forward side in the depressing direction). This prevents the slip-off of the push key 41 through the opening 71.

The tact switch 43 is supported by the board 23 stored in the hollow space inside the opening 71 of the panel body 21.

Between the tip end face of the pushing part 53 of the push key 41 and a pushed face of the tact switch 43, a slight gap is formed. The depressed face 59 of the operated part 51 of the push key 41 is not protruded from the back face of the panel body 21 and disposed in a recessed position with respect to the back face.

An operation of the push switch 37 of the operation panel 15 having the above described configuration will be described. When the push key 41 is operated to switch the tact switch 43 from the OFF state to the ON state, the user makes his finger enter through the opening 71 of the panel body 21 and then depresses (pushes up) the depressed face 59 of the operated part 51 of the push key 41 with his finger. At this time, the flanges 57 of the operated part 51 are guided along the base portions 73a of the four elastic pieces 73. Then, the push key 41 is depressed (refer to a white void arrow in FIG. 6B), the pushing part 53 pushes in the tact switch 43, and the tact switch 43 is switched from the OFF state to the ON state. Additionally, when the push key 41 is depressed, as shown in FIG. 6B, contact positions of the elastic pieces 73 of the panel body 21 with the tapered parts 53b of the push key 41 are relatively shifted in an opposite direction to the tapered direction of the tapered parts 53b. Then, the tapered parts 53b elastically deforms the elastic pieces 73 to be pushed open outwardly (refer to solid line arrows in FIG. 6B).

After the tact switch 43 is pushed by the push key 41 to be switched from the OFF state to the ON state, the depressing of the push key 41 is released. Then, the tact switch 43 is automatically switched from the ON state to the OFF state by its own returning force. Additionally, the elastic pieces 73 which are elastically deformed to be pushed open outwardly by the tapered parts 53b of the push key 41 are elastically returned to their original posture. By the restoring force of the elastic pieces 73, the push key 41 is pushed up in a direction separate from the tact switch 43, separated from the tact switch and then returns its original position.

As described above, according to the push switch 37 of the present disclosure, after the depressing of the push key 41 is released, the push key 41 is pushed up to the original position by the elastically returning of the elastic pieces 73. Accordingly, in order to switch the tact switch 43 from the ON state to the OFF state, only by releasing the depressing of the push key 41, it becomes possible to push up the push key 41 to the original position automatically. Additionally, because the elastic pieces 73 are formed integrally with the panel body 21, there is no need to use a member separate from the panel body 21, such as the elastic arm and the hinge. The push key 41 and the elastic pieces 73 have a simple structure so that it becomes possible to make the panel body 21 simple and to produce it with low cost.

Additionally, the slip-off of the push key 41 from the panel body 21 is prevented so that it becomes possible to support the push key 41 to the panel body 21 regardless of the position of the opening 71. For example, like this embodiment, it becomes possible to form the opening 71 on the back face of the panel body 21. Furthermore, the depressed face 59 of the push key 41 is disposed in a recessed position with respect to the surface of the panel body 21. Accordingly, it becomes possible to prevent the push key 41 from being operated accidentally by the user. Then, the push switch 37 may be used as a hidden key which is operated by a service man when it is needed.

Although the present disclosure described the specific embodiment, the present disclosure is not limited to the embodiment. It is to be noted that one skilled in the art can modify the embodiment without departing from the scope and spirit of the present disclosure.

The invention claimed is:

1. An operation panel comprising: a push key depressed through an opening formed in a panel body; and a switch pushed by depressing of the push key, wherein the push key includes a tapered part tapered toward the switch and a depressed face formed on an opposite end face to the switch and depressed by a user, the panel body includes an elastic piece inclined toward the tapered part from a circumference of the opening and elastically deformable to an opposite side to the tapered part, the depressed face is always disposed in a recessed position with respect to a surface of the panel body, when the depressed face of the push key is depressed, the elastic piece is elastically deformed to the opposite side by the tapered part, and when the depressing of the push key is released, the push key is pushed up by an elastic restoring force of the elastic piece; wherein the elastic piece is formed integrally with the panel body, and includes a base portion bent toward the switch at an approximately right angle with respect to the surface of the panel body, and a tip end portion bent from a tip end of the base portion toward a center of the opening at an obtuse angle with respect to the base portion.

2. The operation panel according to claim 1, wherein the elastic piece has a projection protruding toward the push key, and
the push key has a slip-off prevention projection on a side closer to the switch than the projection, and the slip-off projection is overlapped with the projection in a depressing direction of the push key.

3. The operation panel according to claim 1, wherein the push key includes:
a columnar operated part on a side of being depressed by a user; and
a pushing part disposed coaxially with the operated part on a side of the switch,
the pushing part is formed in a parallelepiped shape having a pair of long side faces and a pair of short side faces, and
the tapered part is formed in the pair of short side faces.

4. The control panel according to claim 1, wherein the opening is formed on a back face of the panel body.

5. An image forming apparatus comprising the operation panel according to claim 1.

* * * * *